(12) United States Patent
Niu et al.

(10) Patent No.: US 9,121,976 B2
(45) Date of Patent: Sep. 1, 2015

(54) LIGHT GUIDE PLATE AND RELATED BACKLIGHT MODULE

(71) Applicant: Wistron Corporation, New Taipei (TW)

(72) Inventors: Ya-Ping Niu, New Taipei (TW); Chin-Yung Liu, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 87 days.

(21) Appl. No.: 14/165,524

(22) Filed: Jan. 27, 2014

(65) Prior Publication Data

US 2015/0098246 A1   Apr. 9, 2015

(30) Foreign Application Priority Data

Oct. 9, 2013   (CN) .......................... 2013 1 0468259

(51) Int. Cl.
*F21V 8/00*   (2006.01)
(52) U.S. Cl.
CPC ............ *G02B 6/0016* (2013.01); *G02B 6/0036* (2013.01)
(58) Field of Classification Search
CPC .................................................... G02B 6/0036
See application file for complete search history.

(56) References Cited

U.S. PATENT DOCUMENTS

| 8,075,174 | B2 | 12/2011 | Tsai | |
|---|---|---|---|---|
| 2006/0152943 | A1* | 7/2006 | Ko et al. | 362/627 |
| 2012/0051088 | A1* | 3/2012 | Chui et al. | 362/608 |

FOREIGN PATENT DOCUMENTS

| TW | I397724 | 6/2013 |
|---|---|---|
| TW | I402545 | 7/2013 |

* cited by examiner

*Primary Examiner* — Mary Ellen Bowman
(74) *Attorney, Agent, or Firm* — Winston Hsu; Scott Margo

(57) ABSTRACT

A light guide plate disclosed in the present disclosure includes a board body, a prism component and at least one optical microstructure. The prism component is disposed on at least one surface of the board body. The at least one optical microstructure is disposed on a top end of the prism component. The optical microstructure includes a first light guiding unit and at least two second light guiding units. A first angle is formed between two inclined surfaces of the first light guiding unit, and the first angle is substantially between 45~60 degrees. The second light guiding units are symmetrically disposed on opposite sides of the first light guiding unit. A second angle is formed between an inclined surface and a bottom surface of each second light guiding unit, and the second angle is substantially between 10~60 degrees.

16 Claims, 7 Drawing Sheets

LIGHT GUIDE PLATE AND RELATED BACKLIGHT MODULE

BACKGROUND OF THE DISCLOSURE

1. Field of the Disclosure

The present disclosure relates to a light guide plate and a related backlight module, and more particularly, to a light guide plate and a related backlight module with the optical microstructure to increase luminance and uniformity.

2. Description of the Prior Art

The light guide plate is utilized to transform a point light source into a planar light source. The lighting unit is disposed on the lateral surface of the light guide plate. The beam outputted from the lighting unit can enter the light guide plate and transmit out of the light emitting surface of the light guide plate to form the planar light source. The optical microstructure is selectively disposed on the low surface, the upper surface (the light emitting surface), the lateral surface (the light inputting surface) and the inner of the light guide plate for uniformity of the planer light source. The optical microstructure can be adapted to destroy total internal reflection of the light guide plate to guide the beam transmitted through the light emitting surface. The conventional optical microstructure includes the hemisphere structure, the V-cut structure and the R-cut structure, which have drawbacks of luminance non-uniformity, low luminance and edge leakage.

SUMMARY OF THE DISCLOSURE

The present disclosure provides a light guide plate and a related backlight module with the optical microstructure to effectively increase luminance and uniformity for solving above drawbacks.

According to the claimed disclosure, a light guide plate includes a board body, a prism component and at least one optical microstructure. The prism component is disposed on at least one surface of the board body. The at least one optical microstructure is disposed on a top end of the prism component. The optical microstructure includes a first light guiding unit and at least two second light guiding units. A first angle is formed between two inclined surfaces of the first light guiding unit, and the first angle is substantially between 45~60 degrees. The second light guiding units are symmetrically disposed on opposite sides of the first light guiding unit. A second angle is formed between an inclined surface and a bottom surface of each second light guiding unit, and the second angle is substantially between 10~60 degrees.

According to the claimed disclosure, the prism component is disposed on an upper surface, a low surface or a lateral surface of the board body.

According to the claimed disclosure, an angle formed between two inclined surfaces of the each second light guiding unit is substantially equal to 90 degrees.

According to the claimed disclosure, the each second light guiding unit includes a long inclined surface and a short inclined surface. The short inclined surface is adjacent to the first light guiding unit.

According to the claimed disclosure, the optical microstructure further includes at least two third light guiding units symmetrically disposed on opposite sides of the first light guiding unit. Each third light guiding unit is located between the first light guiding unit and the corresponding second light guiding unit.

According to the claimed disclosure, a third angle is formed between two inclined surfaces of the each third light guiding unit. The third angle is substantially equal to 90 degrees.

According to the claimed disclosure, two inclined surfaces of the each third light guiding unit are connected in a linear continuous manner to form an arc portion.

According to the claimed disclosure, the board body is a rectangular structure. The light guide plate includes a plurality of prism components, and the plurality of prism components is disposed on the board body in a vertical arrangement, a transverse arrangement, a diagonal arrangement, a linear arrangement or a nonlinear arrangement.

According to the claimed disclosure, a backlight module includes a light source and a light guide plate. The light guide plate includes a board body, a prism component and at least one optical microstructure. The prism component is disposed on at least one surface of the board body. The at least one optical microstructure is disposed on a top end of the prism component. The optical microstructure includes a first light guiding unit and at least two second light guiding units. A first angle is formed between two inclined surfaces of the first light guiding unit, and the first angle is substantially between 45~60 degrees. The second light guiding units are symmetrically disposed on opposite sides of the first light guiding unit. A second angle is formed between an inclined surface and a bottom surface of each second light guiding unit, and the second angle is substantially between 10~60 degrees.

Each optical microstructure of the present disclosure includes the plurality of light guiding units symmetrically arranged to each other. The optical microstructure can be made of all kinds of optical polymer, such as polymethyl methacrylate (PMMA), polyethylene terephthalate (PET) and polycarbonate (PC). The light guiding units with different shapes respectively provide different functions of condenser and diffusion. The user can select the light guiding units with needed shapes according to design demand to form the suitable optical microstructure. Besides, the optical microstructure is disposed on the top end of the prism component, and the prism component is preferably disposed on the upper surface or the lateral surface of the board body. The prism component can be integrated with the board body monolithically. The prism component further can be disposed on the board body in a mechanical processing manner or in a thermal modeling manner.

The prism component with the optical microstructure disposed on the lateral surface of the board body can be utilized to replace the conventional V-cut light guide structure and the conventional R-cut light guide structure, so as to solve edge leakage of the conventional light guide plate. The prism component with the optical microstructure disposed on the upper surface of the light guide plate can be utilized to condense and diffuse the beam according to actual demand, so as to provide the soft luminance of the light guide plate. Therefore, the light guide plate and the related backlight module of the present disclosure have advantages of luminance increase, fault cover and luminance uniformity.

These and other objectives of the present disclosure will no doubt become obvious to those of ordinary skill in the art after reading the following detailed description of the preferred embodiment that is illustrated in the various figures and drawings.

DETAILED DESCRIPTION

Figure 1:
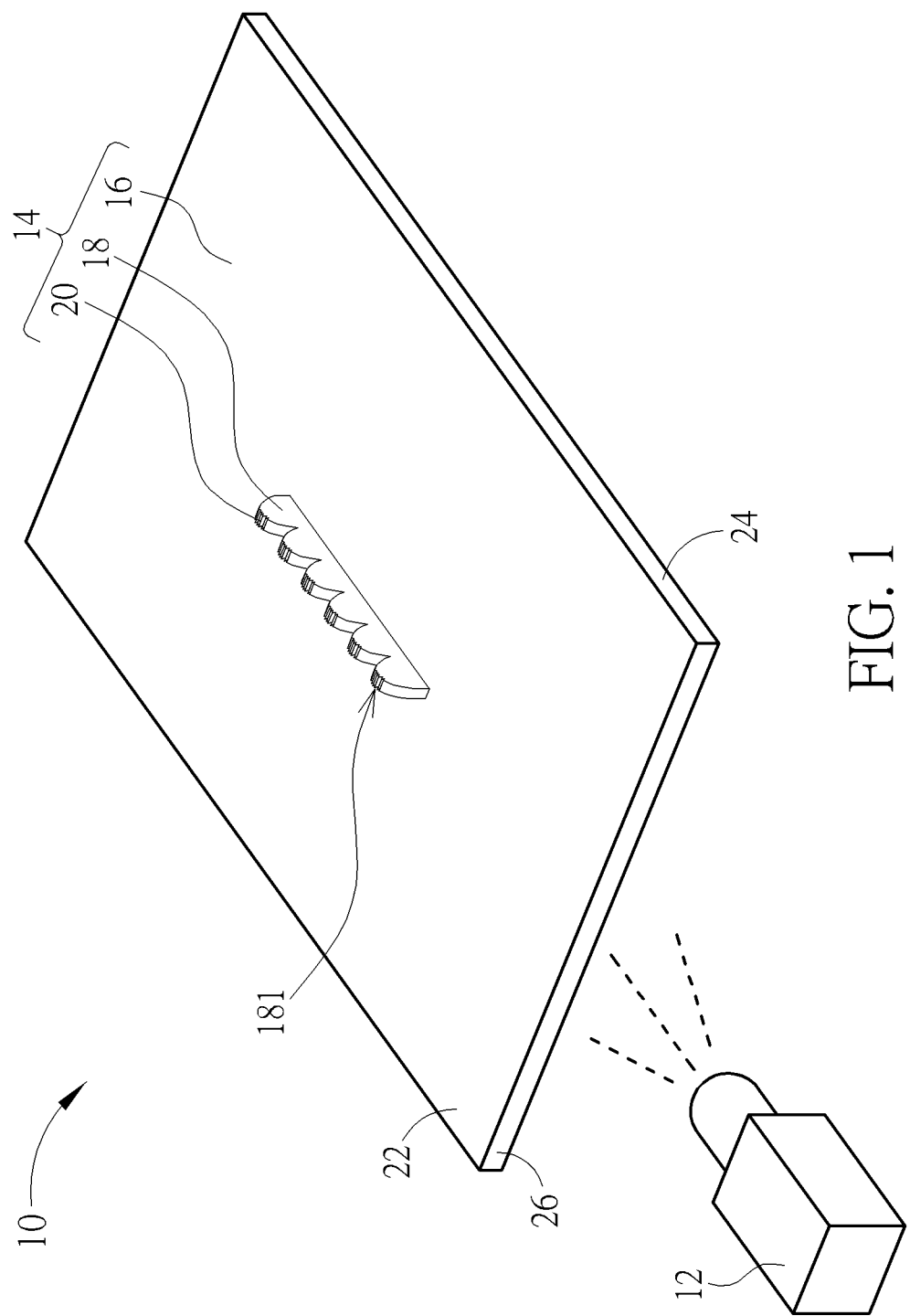
FIG. 1 is a diagram of a backlight module according to an embodiment of the present disclosure.

Please refer to FIG. 1. FIG. 1 is a diagram of a backlight module 10 according to an embodiment of the present disclosure. The backlight module 10 includes a light source 12 and a light guide plate 14. A beam outputted by the light source 12 enters the light guide plate 14 via the light inputting surface. The beam is transmitted to the whole light guide plate 14 by total internal reflection, and is further out of the light guide plate 14 via the light emitting surface to form a planar light source. The light guide plate 14 includes a board body 16, at least one prism component 18 and at least one optical microstructure 20. The board body 16 includes an upper surface 22, a low surface 24 and a lateral surface 26. The light source 12 is disposed on the lateral surface 26 (the light inputting surface).

The prism component 18 can be selectively disposed on the upper surface 22, the low surface 24 or the lateral surface 26. The prism component 18 is utilized to destroy the total internal reflection of the board body 16, so as to guide the beam out of the light guide plate 14 via the upper surface 22 (the light emitting surface). Generally, the board body 16 is a rectangular structure, and the prism components 18 can be disposed on the board body 16 in a vertical arrangement, a transverse arrangement, a diagonal arrangement, a linear arrangement or a nonlinear arrangement. At least one or more optical microstructures 20 can be disposed on a top end 181 of each prism component 18. The optical microstructure 20 includes a plurality of light guiding units to increase luminance and uniformity of the light guide plate 14.

Figure 2:
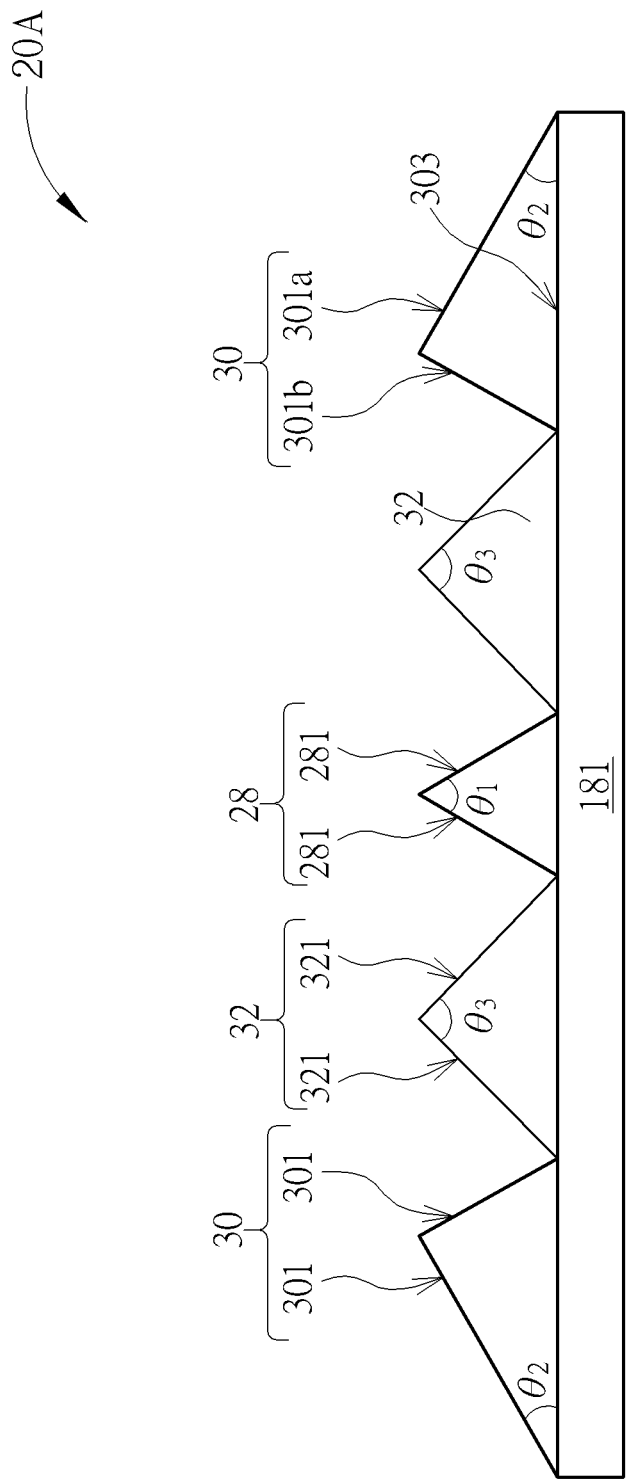
FIG. 2 is a sectional view of an optical microstructure according to a first embodiment of the present disclosure.

Please refer to FIG. 2. FIG. 2 is a sectional view of the optical microstructure 20A according to a first embodiment of the present disclosure. The optical microstructure 20A includes a first light guiding unit 28, at least two second light guiding units 30 and at least two third light guiding units 32. A first angle θ1 is formed between two inclined surfaces 281 of the first light guiding unit 28, and the first angle θ1 is preferably equal to 60 degrees. The two second light guiding units 30 are symmetrically disposed on opposite sides (the left side and the right side shown in FIG. 2) of the first light guiding unit 28. A second angle θ2 is formed between an inclined surface 301 and a bottom surface 303 of the second light guiding unit 30, and the second angle θ2 is preferably equal to 30 degrees. The two third light guiding units 32 are symmetrically disposed on opposite sides (the left side and the right side) of the first light guiding unit 28, and each third light guiding unit 32 is located between the first light guiding unit 28 and the corresponding second light guiding unit 30. A third angle θ3 is formed between two inclined surfaces 321 of the third light guiding unit 32, and the third angle θ3 is preferably equal to 90 degrees.

In the first embodiment shown in FIG. 2, the first light guiding unit 28, the second light guiding unit 30 and the third light guiding unit 32 can be arranged on the prism component 18 continuously or discontinuously. The angle formed between two inclined surfaces 301 of the second light guiding unit 30 is substantially equal to 90 degrees. In addition, the inclined surfaces 301 of the second light guiding unit 30 further can be composed of the long inclined surface 301a and the short inclined surface 301b. The short inclined surface 301b of the second light guiding unit 30 is adjacent to the first light guiding unit 28, which means the long inclined surface 301a is located on an outer edge of the optical microstructure 20A. The beam can be transmitted through the optical microstructure 20A and refracted by the second light guiding unit 30 from lateral edge to central position, so as to increase utility efficiency of the beam and to prevent edges of the optical microstructure 20A from luminance nonuniformity. The optical microstructure 20A can increase luminance of the light guide plate 14 to 230 percent, which is greater than the conventional prism without the optical microstructure.

Figure 3:
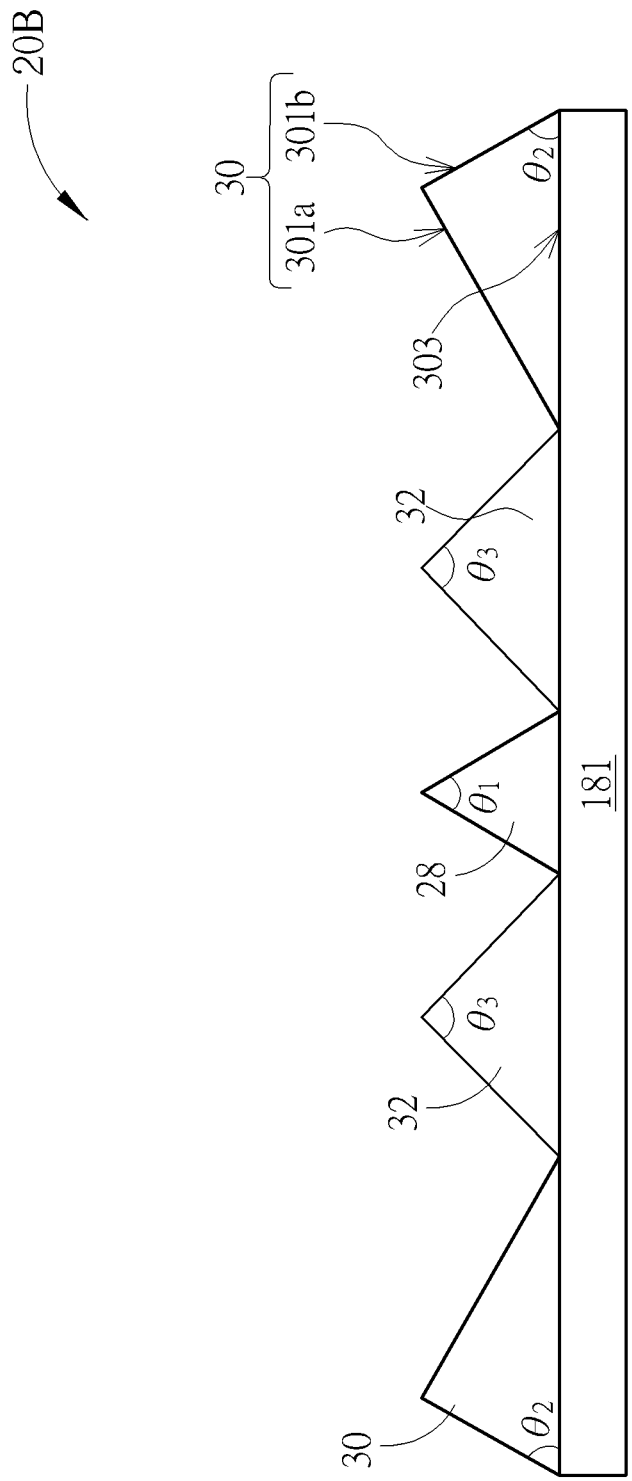
FIG. 3 is a sectional view of the optical microstructure according to a second embodiment of the present disclosure.

Please refer to FIG. 3. FIG. 3 is a sectional view of the optical microstructure 20B according to a second embodiment of the present disclosure. In the second embodiment, elements having the same numeral have the same structures and functions as ones of the first embodiment, and the detailed description is omitted herein for simplicity. As shown in FIG. 3, the first angle θ1 of the first light guiding unit 28 can be preferably equal to 60 degrees. The second angle θ2 of the second light guiding unit 30 can be preferably equal to 60 degrees, the second light guiding unit 30 is disposed on the top end 181 and the long inclined surface 301a is adjacent to the first light guiding unit 28. The third angle θ3 of the third light guiding unit 32 can be preferably equal to 90 degrees. The optical microstructure 20B can increase the luminance of the light guide plate 14 to 140 percent, which is greater than the conventional prism without the optical microstructure.

Figure 4:
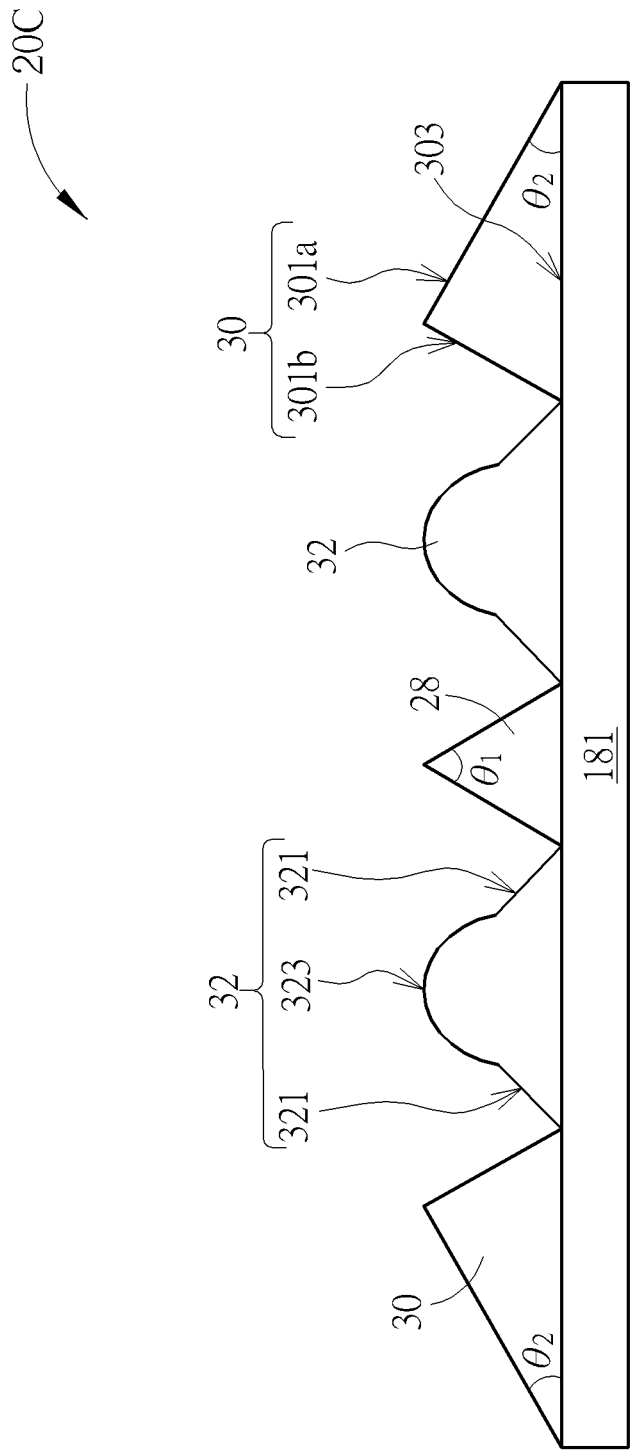
FIG. 4 is a sectional view of the optical microstructure according to a third embodiment of the present disclosure.

Please refer to FIG. 4. FIG. 4 is a sectional view of the optical microstructure 20C according to a third embodiment of the present disclosure. In the third embodiment, elements having the same numeral have the same structures and functions as ones of the above-mentioned embodiments, and the detailed description is omitted herein for simplicity. As shown in FIG. 4, the first angle θ1 of the first light guiding unit 28 can be preferably equal to 60 degrees. The second angle θ2 of the second light guiding unit 30 can be preferably equal to 30 degrees, and the short inclined surface 301b of the second light guiding unit 30 is adjacent to the first light guiding unit 28. Difference between the third embodiment and the above-mentioned embodiments is that the inclined surfaces 321 of the third light guiding unit 32 are connected in a linear continuous manner to from an arc portion 323. The arc portion 323 is made of organic material or inorganic material with optical diffusion property. The third light guiding unit 32 utilizes the arc portion 323 to uniform the transmission beam for covering nodes.

Figure 5:
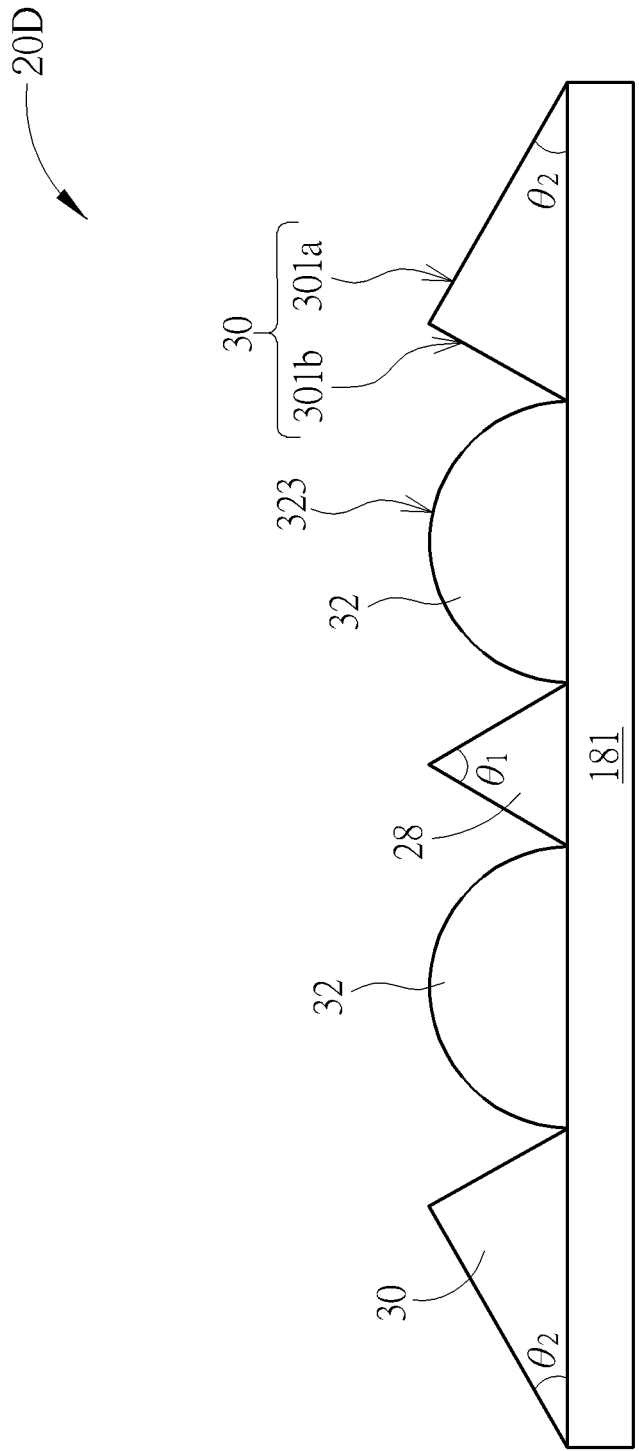
FIG. 5 is a sectional view of the optical microstructure according to a fourth embodiment of the present disclosure.

Please refer to FIG. 5. FIG. 5 is a sectional view of the optical microstructure 20D according to a fourth embodiment of the present disclosure. In the fourth embodiment, elements having the same numeral have the same structures and functions as ones of the above-mentioned embodiments, and the detailed description is omitted herein for simplicity. As shown in FIG. 5, the first angle θ1 of the first light guiding unit 28 can be preferably equal to 60 degrees. The second angle θ2 of the second light guiding unit 30 can be preferably equal to 30 degrees, and the short inclined surface 301b of the second light guiding unit 30 is adjacent to the first light guiding unit 28. Comparing to the third embodiment, the third light guiding unit 32 of the fourth embodiment includes a hemisphere arc portion 323 integrated by the inclined surface and the arc portion. Material of the hemisphere arc portion 323 can be identical to the partial arc portion 323 of the third embodiment. The hemisphere arc portion 323 can be utilized to atomize the beam, and the transmission beam through the first light guiding unit 28 and the second light guiding unit 30 does not generate the obvious nodes. The optical microstructure 20C and 20D can increase the luminance of the light guide plate 14 to 117~118 percent, which is greater than the conventional prism without the optical microstructure.

The present disclosure discloses the prism component 18 with the optical microstructure 20 disposed on the top end 181. The first angle θ1 of the first light guiding unit 28 can be designed within a range of 45~60 degrees. The second angle θ2 of the second light guiding unit 30 can be designed within a range of 10~60 degrees (may be substantially equal to 60 degrees or further alternatively within the range of 10~45 degrees), which depends on position of the inclined surface 301. The preferred first angle θ1 is substantially equal to 60 degrees, and the preferred second angle θ2 is substantially equal to 30 degrees. The third angle θ3 of the third light guiding unit 32 can be designed within a range of 45~90 degrees, the preferred third angle θ3 is substantially equal to 90 degrees. Besides, the third angle of the third light guiding unit 32 can be replaced by the partial arc portion 323 or the hemisphere arc portion 323. Parameter of the above-mentioned angles can have tolerance about 10~15 percent.

Figure 6:
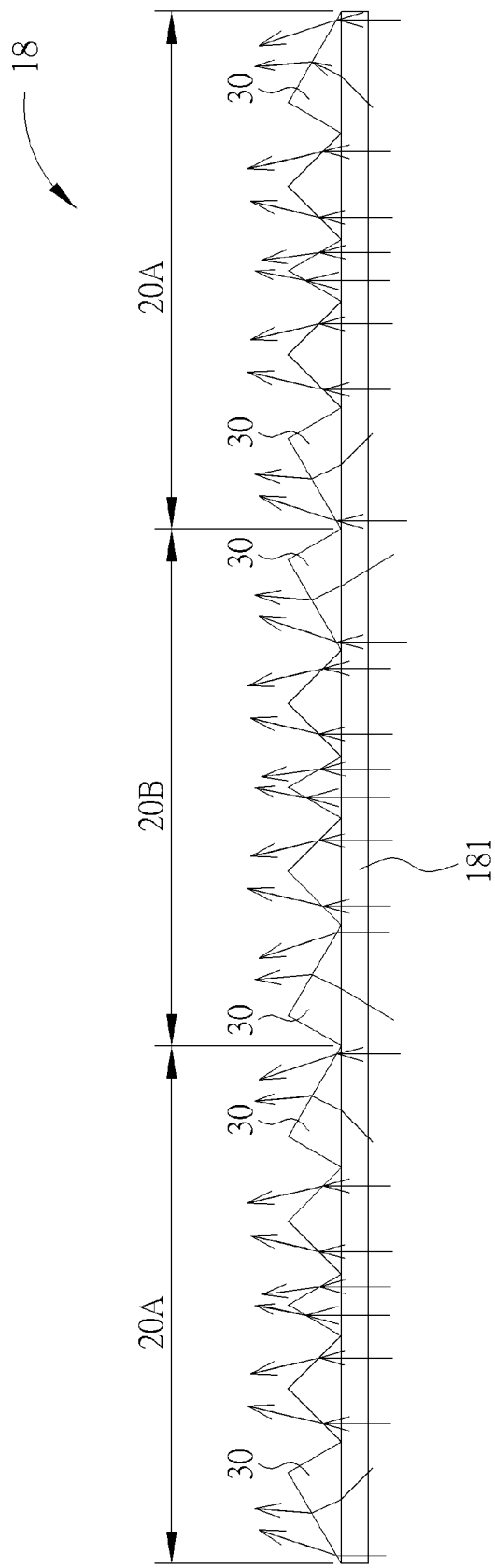
FIG. 6 and FIG. 7 respectively are sectional views of a prism component according to different embodiments of the present disclosure.
Figure 7:
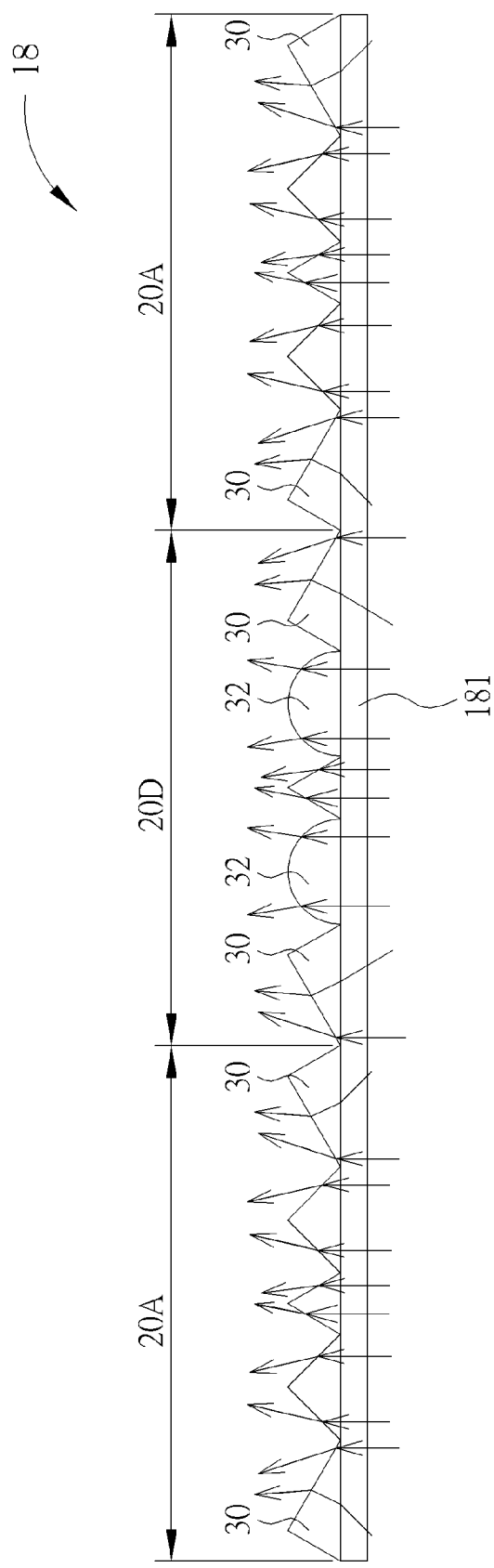

Please refer to FIG. 6 and FIG. 7. FIG. 6 and FIG. 7 respectively are sectional views of the prism component 18 according to different embodiments of the present disclosure. As shown in FIG. 6, the plurality of optical microstructures 20, such as two optical microstructures 20A and one optical microstructure 20B, can be simultaneously disposed on the top end 181 of the prism component 18. The optical microstructure 20B is located between the two optical microstructures 20A. The beam can be refracted from the lateral edge to the middle position of the prism component 18 via the optical microstructure 20A, so that the optical microstructures 20A are disposed on edges of the top end 181 to increase utility efficiency of the prism component 18. The beam is refracted inwardly (as the arrow shown in figures) by the inner second light guiding unit 30 of each optical microstructure 20A, and the second light guiding unit 30 of the optical microstructure 20B is utilized to refract the beam outwardly (as the arrow shown in figures) to prevent a boundary between the optical microstructure 20A and the optical microstructure 20B from the luminance nonuniformity, which effectively increases the luminance and the uniformity.

As shown in FIG. 7, the optical microstructure 20D is located between the two optical microstructures 20A, and the beam is refracted from the lateral edge to the middle position of the optical microstructures 20A and the optical microstructure 20D via the second light guiding units 30. The third light guiding unit 32 of the optical microstructure 20D provides optical diffusion function to effectively uniform the transmission beam through the prism component 18 for covering the nodes.

In conclusion, each optical microstructure of the present disclosure includes the plurality of light guiding units symmetrically arranged to each other. The optical microstructure can be made of all kinds of optical polymer, such as polymethyl methacrylate (PMMA), polyethylene terephthalate (PET) and polycarbonate (PC). The light guiding units with different shapes respectively provide different functions of condenser and diffusion. The user can select the light guiding units with needed shapes according to design demand to form the suitable optical microstructure. Besides, the optical microstructure is disposed on the top end of the prism component, and the prism component is preferably disposed on the upper surface or the lateral surface of the board body. The prism component can be integrated with the board body monolithically. The prism component further can be disposed on the board body in a mechanical processing manner or in a thermal modeling manner.

The prism component with the optical microstructure disposed on the lateral surface of the board body can be utilized to replace the conventional V-cut light guide structure and the conventional R-cut light guide structure, so as to solve edge leakage of the conventional light guide plate. The prism component with the optical microstructure disposed on the upper surface of the light guide plate can be utilized to condense and diffuse the beam according to actual demand, so as to provide the soft luminance of the light guide plate. Therefore, the light guide plate and the related backlight module of the present disclosure have advantages of luminance increase, fault cover and luminance uniformity.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A light guide plate comprising:
   a board body;
   a prism component disposed on at least one surface of the board body; and
   at least one optical microstructure disposed on a top end of the prism component, the optical microstructure comprising:
     a first light guiding unit, a first angle being formed between two inclined surfaces of the first light guiding unit, and the first angle being substantially between 45~60 degrees; and
     at least two second light guiding units symmetrically disposed on opposite sides of the first light guiding unit, a second angle being formed between an inclined surface and a bottom surface of each second light guiding unit, and the second angle being substantially between 10~60 degrees.

2. The light guide plate of claim 1, wherein the prism component is disposed on an upper surface, a low surface or a lateral surface of the board body.

3. The light guide plate of claim 1, wherein an angle formed between two inclined surfaces of the each second light guiding unit is substantially equal to 90 degrees.

4. The light guide plate of claim 3, wherein the each second light guiding unit comprises a long inclined surface and a short inclined surface, the short inclined surface is adjacent to the first light guiding unit.

5. The light guide plate of claim 1, wherein the optical microstructure further comprises:
   at least two third light guiding units symmetrically disposed on opposite sides of the first light guiding unit, each third light guiding unit being located between the first light guiding unit and the corresponding second light guiding unit.

6. The light guide plate of claim 5, wherein a third angle is formed between two inclined surfaces of the each third light guiding unit, the third angle is substantially equal to 90 degrees.

7. The light guide plate of claim 5, wherein two inclined surfaces of the each third light guiding unit are connected in a linear continuous manner to form an arc portion.

8. The light guide plate of claim 1, wherein the board body is a rectangular structure, the light guide plate comprises a plurality of prism components, and the plurality of prism components is disposed on the board body in a vertical arrangement, a transverse arrangement, a diagonal arrangement, a linear arrangement or a nonlinear arrangement.

9. A backlight module comprising:
a light source; and
a light guide plate comprising:
   a board body, the board comprising an upper surface, a low surface and a lateral surface, the light source being disposed on the lateral surface;
   at least one prism component disposed on at least one surface of the board body; and
   at least one optical microstructure disposed on a top end of the prism component, the optical microstructure comprising:
      a first light guiding unit, a first angle being formed between two inclined surfaces of the first light guiding unit, and the first angle being substantially between 45~60 degrees; and
      at least two second light guiding units symmetrically disposed on opposite sides of the first light guiding unit, a second angle being formed between an inclined surface and a bottom surface of each second light guiding unit, and the second angle being substantially between 10~60 degrees.

10. The backlight module of claim 9, wherein the prism component is disposed on the upper surface, the low surface or the lateral surface.

11. The backlight module of claim 9, wherein an angle formed between two inclined surfaces of the each second light guiding unit is substantially equal to 90 degrees.

12. The backlight module of claim 11, wherein the each second light guiding unit comprises a long inclined surface and a short inclined surface, the short inclined surface is adjacent to the first light guiding unit.

13. The backlight module of claim 9, wherein the optical microstructure further comprises:
   at least two third light guiding units symmetrically disposed on opposite sides of the first light guiding unit, each third light guiding unit being located between the first light guiding unit and the corresponding second light guiding unit.

14. The backlight module of claim 13, wherein a third angle is formed between two inclined surfaces of the each third light guiding unit, the third angle is substantially equal to 90 degrees.

15. The backlight module of claim 13, wherein two inclined surfaces of the each third light guiding unit are connected in a linear continuous manner to form an arc portion.

16. The backlight module of claim 9, wherein the board body is a rectangular structure, the light guide plate comprises a plurality of prism components, and the plurality of prism components is disposed on the board body in a vertical arrangement, a transverse arrangement, a diagonal arrangement, a linear arrangement or a nonlinear arrangement.

* * * * *